(12) United States Patent
Miura et al.

(10) Patent No.: US 11,312,296 B2
(45) Date of Patent: Apr. 26, 2022

(54) VEHICLE SOUND GENERATION DEVICE

(71) Applicant: Mazda Motor Corporation, Hiroshima (JP)

(72) Inventors: Yasuhiko Miura, Aki-gun (JP); Keisuke Agusa, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/121,774

(22) Filed: Dec. 15, 2020

(65) Prior Publication Data

US 2021/0221287 A1 Jul. 22, 2021

(30) Foreign Application Priority Data

Jan. 21, 2020 (JP) .............................. JP2020-007343

(51) Int. Cl.
| | |
|---|---|
| *H04B 1/00* | (2006.01) |
| *B60Q 5/00* | (2006.01) |
| *G06F 3/16* | (2006.01) |
| *H04R 1/02* | (2006.01) |
| *G10K 15/02* | (2006.01) |
| *H03G 3/00* | (2006.01) |

(52) U.S. Cl.
CPC .............. *B60Q 5/008* (2013.01); *G06F 3/165* (2013.01); *G10K 15/02* (2013.01); *H04R 1/025* (2013.01); *H04R 2499/13* (2013.01)

(58) Field of Classification Search
CPC ........ B60Q 5/008; G06F 3/165; G10K 15/02; H04R 1/025; H04R 2499/13
USPC ..................................................... 381/86, 104
See application file for complete search history.

(56) References Cited

U.S. PATENT DOCUMENTS

2010/0166210 A1* 7/2010 Isozaki .................. G10K 15/02
381/86

FOREIGN PATENT DOCUMENTS

JP 2017-62320 A 3/2017

* cited by examiner

*Primary Examiner* — Ammar T Hamid
(74) *Attorney, Agent, or Firm* — Xsensus LLP

(57) ABSTRACT

A vehicle sound generation device includes a sound control circuit that sets one or more frequencies according to a number of revolutions of the rotary power source, and generates a synthetic sound signal representing a synthetic sound including one or more element sounds having the one or more frequencies. The sound control circuit sets the synthetic sound so that a sound pressure of the synthetic sound includes a reference sound pressure component and a variable sound pressure component. A magnitude of the reference sound pressure component increases as the number of revolutions of the rotary power source increases, and a magnitude of the variable sound pressure component varies within a predetermined amplitude with a period of a predetermined increase amount of the number of revolutions as the number of revolutions of the rotary power source increases.

11 Claims, 6 Drawing Sheets

VEHICLE SOUND GENERATION DEVICE

CROSS-REFERENCE TO RELATED APPLICATIONS

This application claims priority to JP 2020-007343, filed in Japan on Jan. 21, 2020, the contents of which is hereby incorporated by reference.

Technical Field

The present disclosure relates to a vehicle sound generation device and, more particularly, to a vehicle sound generation device that outputs a predetermined sound during a travel of a vehicle.

BACKGROUND

There is a conventional technique that outputs, to the driver, a sound of a predetermined frequency according to the number of motor revolutions in an electric vehicle (for example, an electric motorcycle) driven by an electric motor. In these electric vehicles, the higher the number of motor revolutions, the higher the frequency of a sound to be generated. Specifically, the rate of changes in the frequency to changes in the number of motor revolutions is set larger in a low speed range than in a high speed range of the number of motor revolutions. Accordingly, changes in the vehicle state such as a motor rotation speed range are transmitted to the driver via changes in the frequency of the sound provided for the driver.

SUMMARY

The present disclosure describes a vehicle sound generation device mounted in a vehicle that travels with a rotary power source including an electric motor and/or an engine, the vehicle sound generation device including a sound control circuit configured to set one or more frequencies according to a number of revolutions of the rotary power source; and generate a synthetic sound signal representing a synthetic sound including one or more element sounds having the one or more frequencies, wherein the sound control circuit sets the synthetic sound so that a sound pressure of the synthetic sound includes a reference sound pressure component and a variable sound pressure component, the reference sound pressure component is set so that a magnitude of the reference sound pressure component increases as the number of revolutions of the rotary power source increases, and the variable sound pressure component is set so that a magnitude of the variable sound pressure component varies within a predetermined amplitude with a period of a predetermined increase amount of the number of revolutions as the number of revolutions of the rotary power source increases.

DETAILED DESCRIPTION OF THE DRAWINGS

In accordance with the present disclosure, a vehicle sound generation device generates a sound so that the driver can easily recognize changes in the vehicle state.

An embodiment of the present disclosure will be described below with reference to the accompanying drawings.

Figure 1:
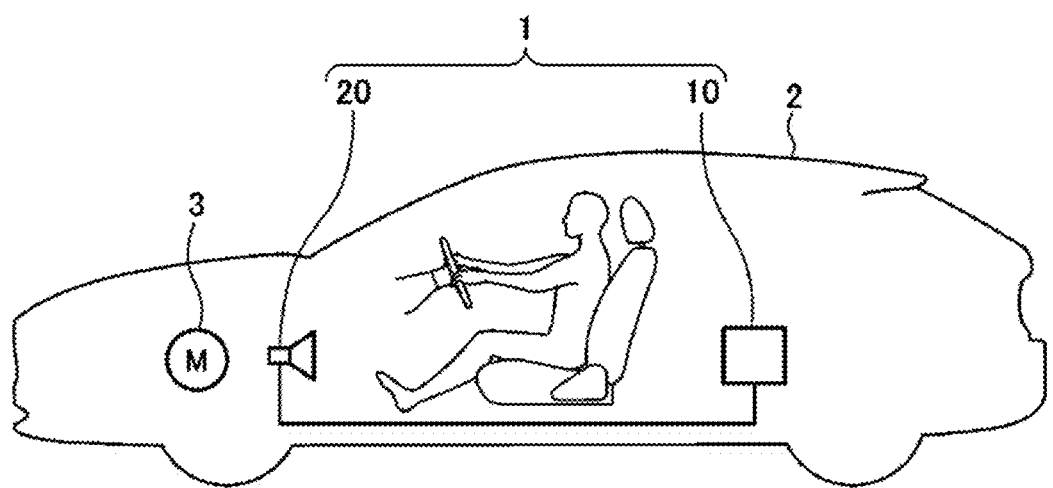
FIG. 1 is an explanatory diagram illustrating a vehicle sound generation device according to an embodiment of the present disclosure.

First, the structure of a vehicle sound generation device according to the present disclosure will be described with reference to FIGS. 1 and 2. FIG. 1 is an explanatory diagram illustrating the vehicle sound generation device and FIG. 2 is a structural diagram illustrating the vehicle sound generation device.

Figure 2:
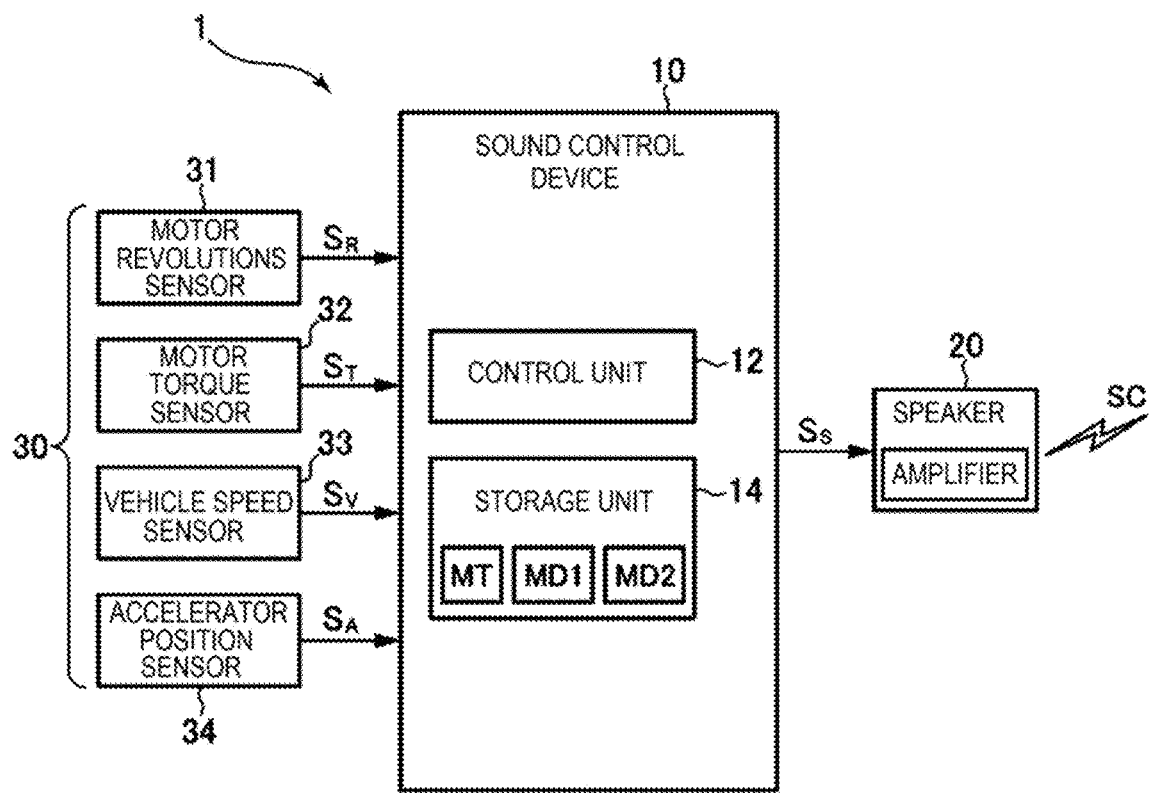
FIG. 2 is a structural diagram illustrating the vehicle sound generation device according to the embodiment of the present disclosure.

As illustrated in FIGS. 1 and 2, a vehicle sound generation device 1 according to the embodiment includes a sound control device 10 that is mounted in a vehicle 2, a speaker 20 that outputs a predetermined sound to a driver in a vehicle interior, and a sensor group 30 of various sensors that detect the states of the vehicle 2.

The vehicle 2 is an electric vehicle (EV) having an electric motor 3 as a rotary power source. Since the vehicle 2 does not have an internal combustion engine (such as a gasoline engine or a diesel engine), so-called engine noise is not generated during a travel. The electric motor 3 generates operating noise, but the operating noise of a motor is smaller than the noise of an engine. Therefore, the driver in the vehicle can hardly recognize the operating noise of the motor. In the embodiment, the vehicle sound generation device 1 generates the sound according to the operation situation of the electric motor 3 so that the driver can grasp the operation situation of the power train of the vehicle 2 including the electric motor 3.

The sound control device 10 is a computer device including a control unit 12 that is a processor, a memory (storage unit 14) that stores various programs and a database, and a data input/output device, and the like. The database includes sound pressure maps MT, MD1, and MD2. The sound control device 10 is communicably connected to other in-vehicle devices via an in-vehicle communication line. The sound control device 10 outputs a sound signal Ss including sound information (such as the frequency and the sound pressure) to the speaker 20 by causing the processor to execute programs based on vehicle information from the sensor group 30.

The control unit 12 of sound control device 10 may include or be encompassed by circuitry. The functionality of the sound control device 10, to be discussed below, may be implemented using circuitry or processing circuitry which includes general purpose processors, special purpose processors, integrated circuits, ASICs ("Application Specific integrated Circuits"), conventional circuitry, controllers, and/or combinations thereof which are configured or programmed to perform the disclosed functionality. Processors and controllers are considered processing circuitry or circuitry as they include transistors and other circuitry therein. In this disclosure, any circuitry, units, controllers, or means are hardware carry out or are programmed to perform the recited functionality. The hardware may be any hardware disclosed herein or otherwise known which is programmed or configured to carry out the recited functionality. When the hardware is a processor or controller which may be considered a type of circuitry, the circuitry, means, or units are a combination of hardware and processing instructions that configure the hardware and/or processor. In the following, control unit 12 of the sound control device 10 may also be referred to as circuit 12, control circuitry 12 and/or processing circuitry 12.

The speaker 20 is a sound output unit having an amplifier. The speaker 20 receives the sound signal Ss from the sound control device 10, amplifies the sound signal Ss with a predetermined amplification factor, and outputs a synthetic sound SC based on the sound signal Ss. It should be noted here that the speaker 20 does not need to be provided in the vehicle interior as long as the driver can recognize the synthetic sound SC generated by the speaker 20.

The sensor group 30 includes a motor revolutions sensor that detects the number of motor revolutions of the electric motor 3, a motor torque sensor 32 that detects the motor torque of the electric motor 3, a vehicle speed sensor 33 that detects the vehicle speed of the vehicle 2, and an accelerator position sensor 34 that detects the accelerator opening. The sensor group 30 transmits signals indicating the detected vehicle information through the in-vehicle communication line. The sound control device 10 can receive various vehicle information signals from the sensor group 30 via the in-vehicle communication line.

The vehicle information signals include a motor revolutions signal $S_R$, a motor torque value signal. $S_T$, a vehicle speed signal $S_V$, and an accelerator opening signal $S_A$. The sound control device 10 (processor) reads the number of revolutions R from the motor revolutions signal $S_R$, reads a motor torque value T from the motor torque value signal $S_T$, reads a vehicle speed V from the vehicle speed signal $S_V$, and reads an accelerator opening. Ac from the accelerator opening signal $S_A$.

Figure 3A:
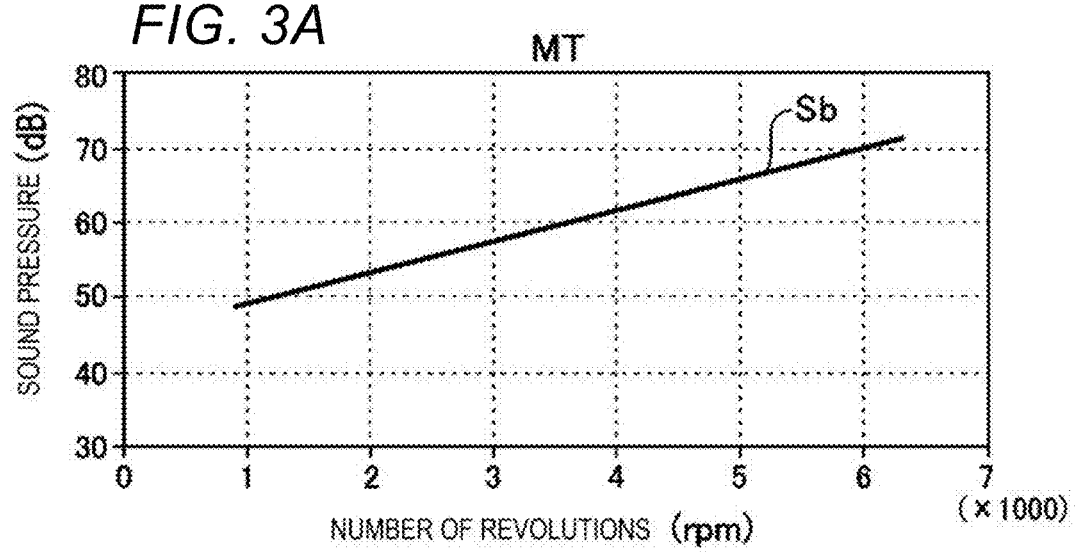
FIG. 3A is a reference sound pressure map according to the embodiment of the present disclosure.
Figure 3B:
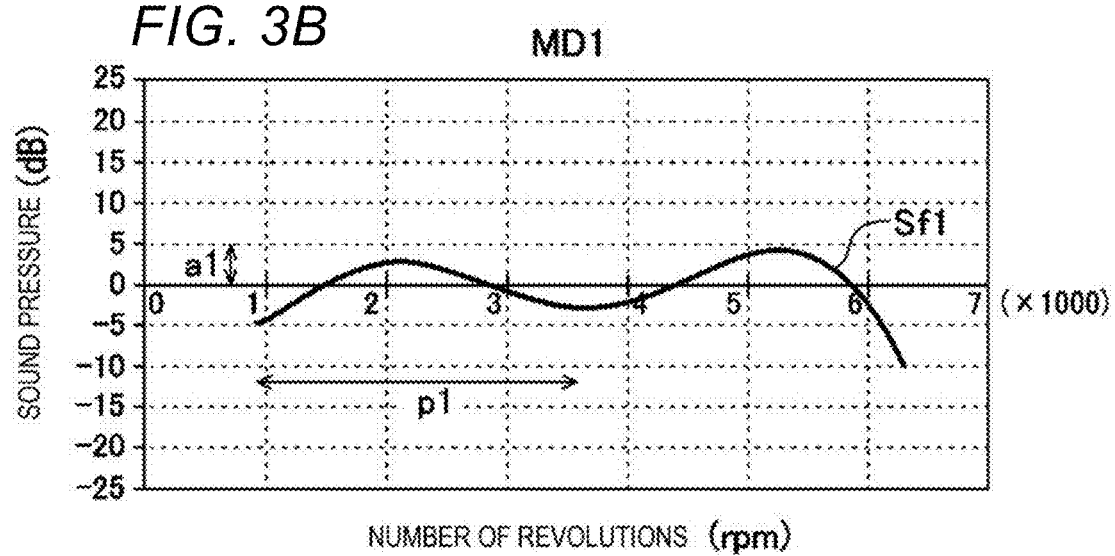
FIG. 3B is a first variable sound pressure map according to the embodiment of the present disclosure.
Figure 3C:
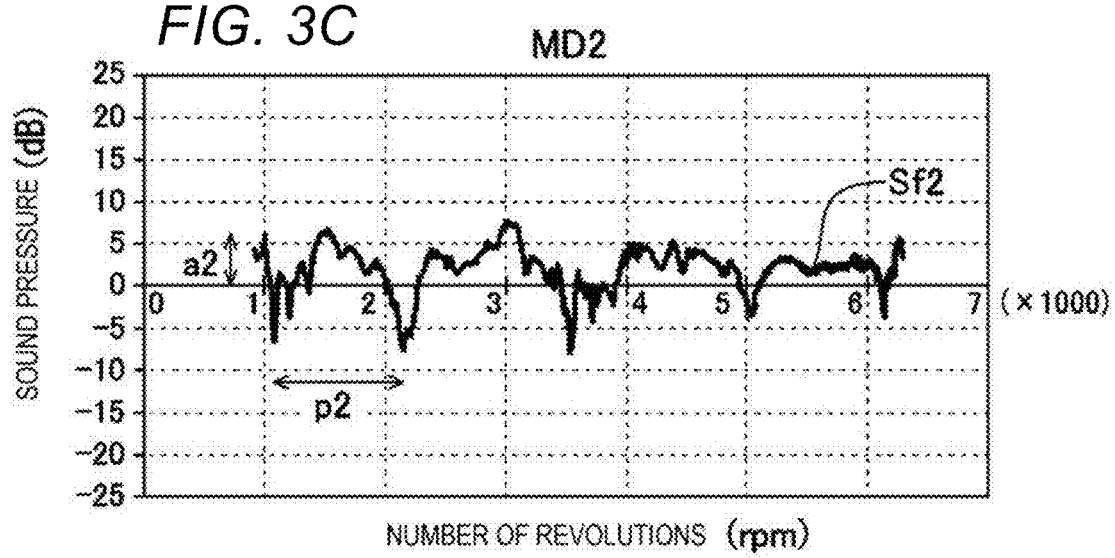
FIG. 3C is a second variable sound pressure map according to the embodiment of the present disclosure.
Figure 4:
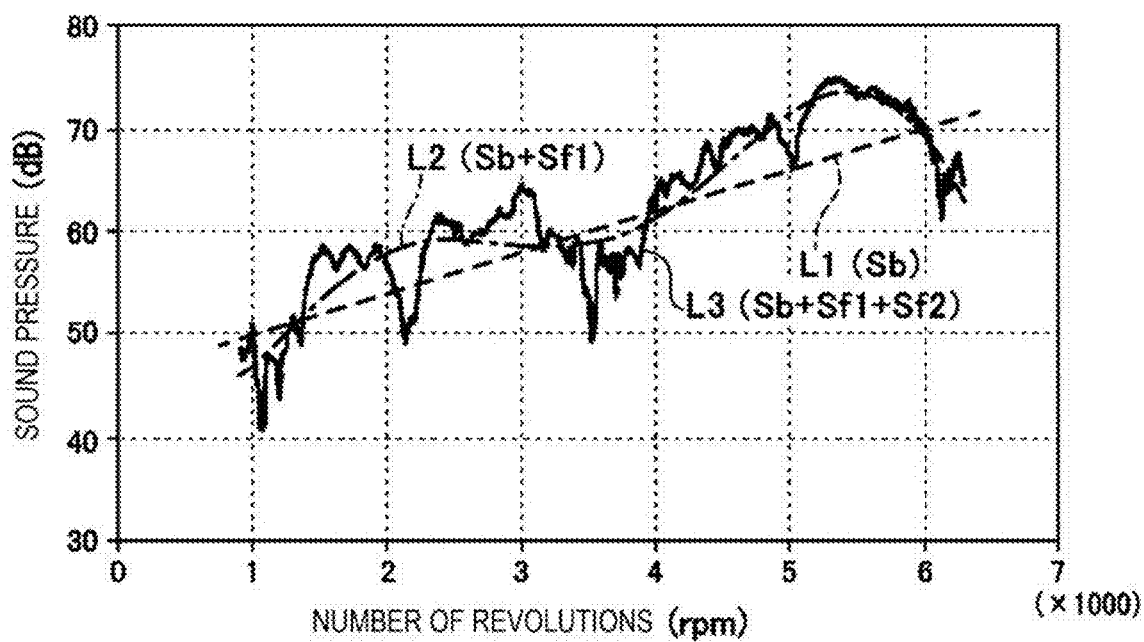
FIG. 4 is an explanatory diagram illustrating synthetic sound according to the embodiment of the present disclosure.

Next, the sound generation processing by the vehicle sound generation device according to the embodiment will be described with reference to FIGS. 3A to 3C and FIG. 4. FIGS. 3A to 3C illustrate a reference sound pressure map, a first variable sound pressure map, and a second variable sound pressure map and FIG. 4 an explanatory diagram illustrating a synthetic sound.

The control unit 12 sets the frequency based on the number of revolutions R, sets the sound pressure corresponding to the set frequency using the reference sound pressure map MT, the first variable sound pressure map MD1, and the second variable sound pressure map MD2 stored in the storage unit 14, and generates a synthetic sound signal Ss representing the element sound having the set frequency and the set sound pressure.

The control unit 12 determines a setting frequency f for the number of revolutions R, which is the primary frequency (reference frequency), based on the following equation:

$$f\text{(Hz)} = k \times R \text{ (Hz)} \qquad \text{(equation 1)}$$

where k is a coefficient having any magnitude. Coefficient k is selected from, for example, 1.6, 2, 2.24, 2.4, 2.67, 3.33, 4, 5.33, and 8.

In the embodiment, the control unit 12 sets a single frequency to generate the synthetic sound SC. Therefore, the number of element sounds to generate the synthetic sound SC is one. However, alternatively, the control unit 12 may set a plurality of frequencies and generate the synthetic sound SC based on a plurality of element sounds. In this case, different frequencies fn (n=1, 2, 3 . . . ) are determined by the values of different coefficients kn (n=1, 2, 3 based on equation 1. Coefficients kn are selected from, for example, 1.6, 2, 2.24, 2.4, 2.67, 3.33, 4, 5.33, and 8 described above.

As illustrated in FIG. 3A, the reference sound pressure map MT is set so that the magnitude of the reference sound pressure increases monotonically as the number of revolutions R increases. Specifically, the reference sound pressure map MT is set so that a reference sound pressure component Sb linearly increases as the number of revolutions R increases. In the example in FIG. 3A, when the number of revolutions R increases to approximately 6200 rpm from approximately 1000 rpm, the reference sound pressure component Sb increases linearly to approximately 70 dB from approximately 50 dB.

As illustrated in FIG. 3B, the first variable sound pressure map MD1 is set so that the magnitude of a first variable sound pressure component Sf1 varies on the basis of a sound pressure of 0 dB as the number of revolutions R increases. Specifically, the first variable sound pressure map MD1 is set so that the first variable sound pressure component Sf1 changes like a substantially sinusoidal wave as the number of revolutions R increases. In the example in FIG. 3B, when the number of revolutions R increases to approximately 6200 rpm from approximately 1000 rpm, the first variable sound pressure component changes with a period p1 of approximately 2500 rpm and an amplitude a1 of approximately 5 dB.

As illustrated in FIG. 3C, the second variable sound pressure map MD2 is set so that the magnitude of the second variable sound pressure component varies on the basis of a sound pressure of 0 dB as the number of revolutions R increases. Specifically, the second variable sound pressure map MD2 is set so that the second variable sound pressure component Sf2 changes like a substantially sinusoidal wave with a high frequency component as the number of revolutions R increases. In the example in FIG. 3C, when the number of revolutions R increases to approximately 6200 rpm from approximately 1000 rpm, the second variable sound pressure component Sf2 varies with a period p2 of approximately 700 rpm to 1200 rpm and an amplitude a2 of approximately 5 dB.

The second variable sound pressure map MD2 is set so as to have a variable sound pressure component with a shorter period than in the first variable sound pressure map MD1. Accordingly, the first variable sound pressure map MD1 defines a long-period variable sound pressure component (Sf1) and the second variable sound pressure map MD2 defines a short-period variable sound pressure component (Sf2). The second variable sound pressure map MD2 mainly has a variable period of approximately 700 rpm to 1200 rpm and has a shorter-period variable sound pressure component. The shorter-period variable sound pressure component has a period of approximately 50 to approximately 100 rpm and an amplitude of approximately 1 dB to 2 dB.

Although the two variable sound pressure maps MD1 and MD2 are used in the embodiment, three or more variable sound pressure maps MDn (n=3, 4, . . . ) may be used in this case, the plurality of variable sound pressure maps can be set so that variable sound pressure components Sfn have periods of, for example, approximately 1000 rpm, approximately 500 rpm, approximately 200 rpm, approximately 100 rpm, approximately 50 rpm, approximately 10 rpm, and approximately 5 rpm.

In addition, in the embodiment, the amplitudes a1 and a2 of the two variable sound pressure maps MD1 and MD2 are set to approximately 8% to 13% of the magnitude of the reference sound pressure component Sb defined by the reference sound pressure map MT with respect to the same number of revolutions R. Therefore, the reference sound pressure component Sb is dominant in the synthetic sound SC to be generated. Accordingly, in the embodiment, when the number of revolutions R increases, the driver recognizes that the sound pressure of the synthetic sound SC totally increases due to an increase in the sound pressure of the reference sound pressure component Sb.

Alternatively, when the synthetic sound SC is generated by a plurality of element sounds, a single reference sound pressure map and one or more variable sound pressure maps may be used for the plurality of element sounds, or a reference sound pressure map and one or more variable sound pressure maps provided for each of the element sounds may be used.

The control unit 12 sets the sound pressure of the element sound of a selected frequency using one or more of the reference sound pressure map MT, the first variable sound pressure map MD1, and the second variable sound pressure map MD2 and generates the sound signal Ss representing the synthetic sound SC based on the element sound having the set sound pressure. The sound pressure of the element sound (synthetic sound SC) with the selected frequency is set to the sound pressure represented by the characteristic line L1, L2, or L3 illustrated in FIG. 4 according to the number of revolutions R.

The characteristic line the same as the characteristic line defined by the reference sound pressure map MT. In this case, the synthetic sound SC includes only the reference sound pressure component Sb that increases monotonically as the number of revolutions R increases.

The characteristic line L2 is obtained by synthesizing (adding) two characteristic lines defined by the reference sound pressure map MT and the first variable sound pressure map MD1. Accordingly, in the characteristic line L2, the long-period variable sound pressure component Sf1 is superimposed on the reference sound pressure component Sb.

The characteristic line L3 is obtained by synthesizing (adding) three characteristic lines defined by the reference sound pressure map MT, the first variable sound pressure map MD1, and the second variable sound pressure map MD2. Accordingly, in the characteristic line L3, the long-period variable sound pressure component Sf1 and the short-period variable sound pressure component Sf2 are superimposed on the reference sound pressure component Sb. Alternatively, a characteristic line in which only the short-period variable sound pressure component Sf2 is superimposed on the reference sound pressure component Sb may be used instead of the characteristic line L3.

Figure 5:
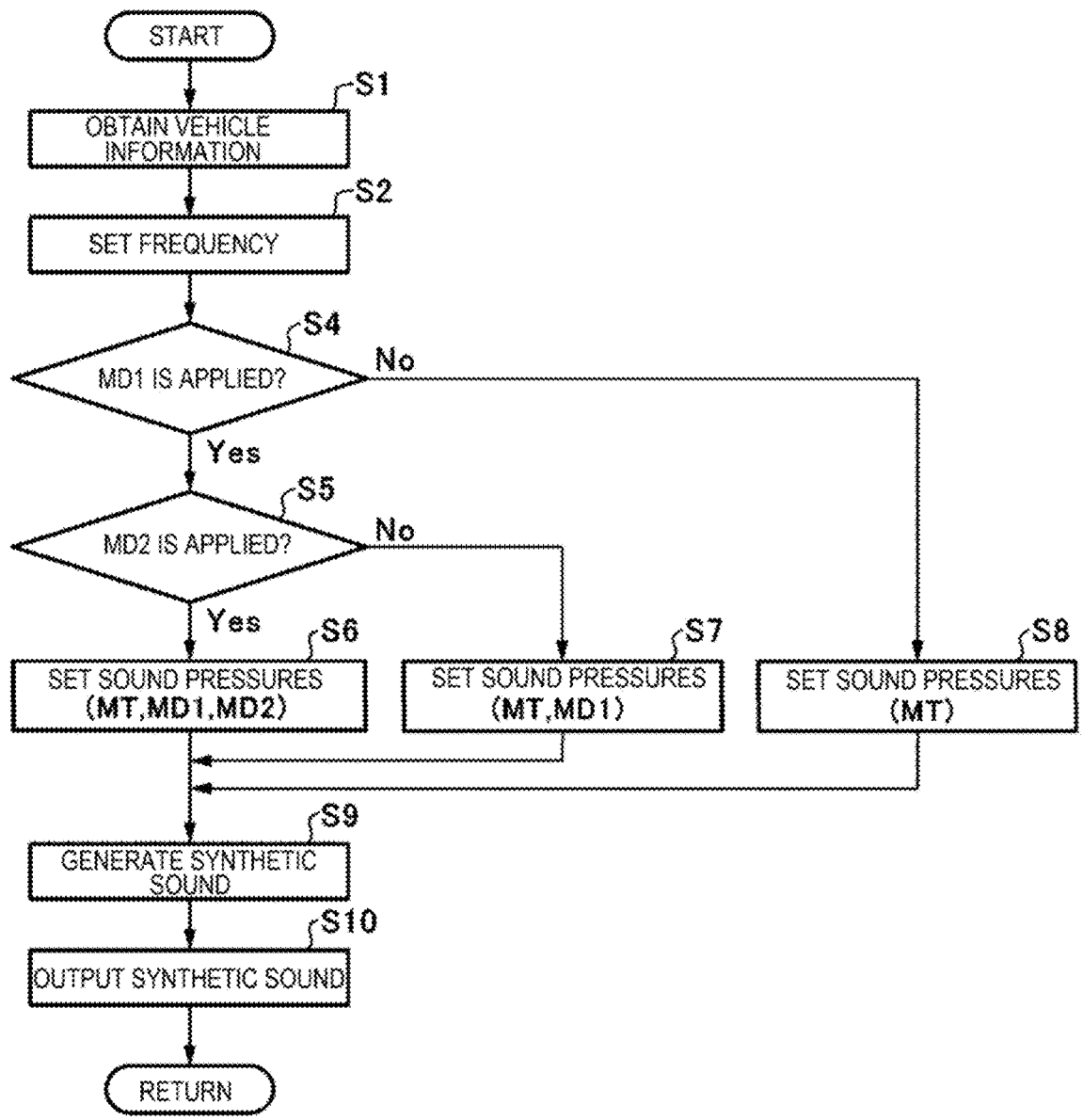
FIG. 5 is a flowchart illustrating sound generation processing according to the embodiment of the present disclosure.

Next, a flow of the sound generation processing by the vehicle sound generation device according to the embodiment will be described with reference to FIG. 5. FIG. 5 is a flowchart illustrating the sound generation processing.

The vehicle sound generation device 1 is configured so that the sound control device 10 (control unit 12) generates the synthetic sound SC (pseudo motor operating noise or pseudo engine operating noise) of the element sounds of one or more frequencies based on vehicle information in the sound generation processing and the speaker 20 out this synthetic sound SC to the driver. The vehicle sound generation device 1 repeatedly executes the sound generation processing illustrated in FIG. 5 every predetermined time (for example, every 10 ms).

First, in the sound generation processing, the control unit 12 obtains vehicle information via the in-vehicle communication line (step S1). As described above, the control unit 12 obtains the number of revolutions R, the motor torque value T, the vehicle speed V, the accelerator opening Ac, and the like.

Next, the control unit 12 performs frequency setting processing (step S2). In the frequency setting processing, based on the number of revolutions R, frequency f a plurality of frequencies fn) is set using equation 1.

Next, in steps S4 and S5, the control unit 12 selects one or more maps to be used from the reference sound pressure map MT, the first variable sound pressure map MD1, and the second variable sound pressure map MD2 stored in the storage unit 14. Specifically, the control unit 12 selects one or more maps to be used based on the accelerator opening Ac.

When the accelerator opening Ac is less than the first threshold (20% in this example) (No in S4), the sound control device 10 (control unit 12) sets the sound pressures of the element sounds using only the reference sound pressure map MT (step S8). In the example in FIG. 4, the sound pressures of the element sounds for the current number of revolutions R are set based on the characteristic line L1.

Alternatively, when the accelerator opening Ac is equal to or more than the first threshold (Yes in S4) and less than the second threshold (50% in this example) (No in S5), the control unit 12 sets the sound pressures of the element sounds using the reference sound pressure map MT and the first variable sound pressure map MD1 (step 37). In the example in FIG. 4, the sound pressures of the element sounds for the current number of revolutions R are set based on the characteristic line L2.

Alternatively, when the accelerator opening Ac is equal to or more than the first threshold (Yes in S4) and equal to or more than the second threshold (Yes in S5), the control unit 12 sets the sound pressures of the element sounds using the reference sound pressure map MT, the first variable sound pressure map MD1, and the second variable sound pressure map MD2 (step S6). In the example in FIG. 4, the sound pressures of the element sounds for the current number of revolutions R are set based on the characteristic line 13.

After the sound pressures of the element sounds are set in steps S6 to S8, the control unit 12 generates the sound signal Ss for generating the synthetic sound SC with the set sound pressures and outputs the sound signal Ss to the speaker 20 (step S9). The speaker 20 receives the sound signal Ss and outputs the synthetic sound SC (step S10).

Figure 6A:
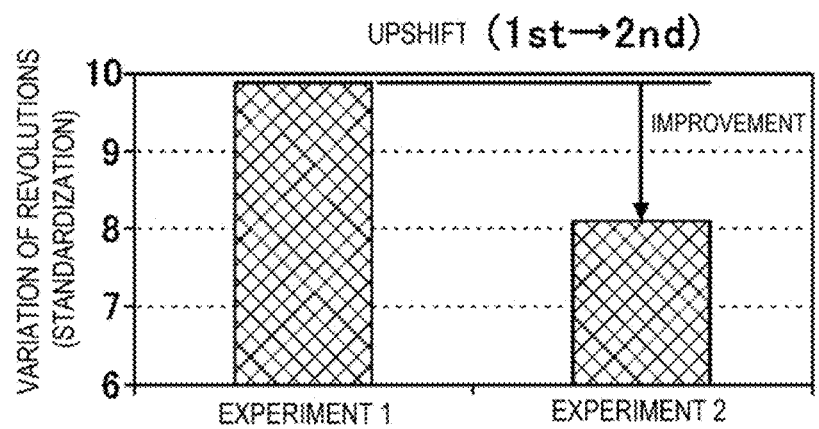
FIG. 6A illustrates the data of the result of an experiment that uses the vehicle sound generation device according to the embodiment of the present disclosure.
Figure 6B:
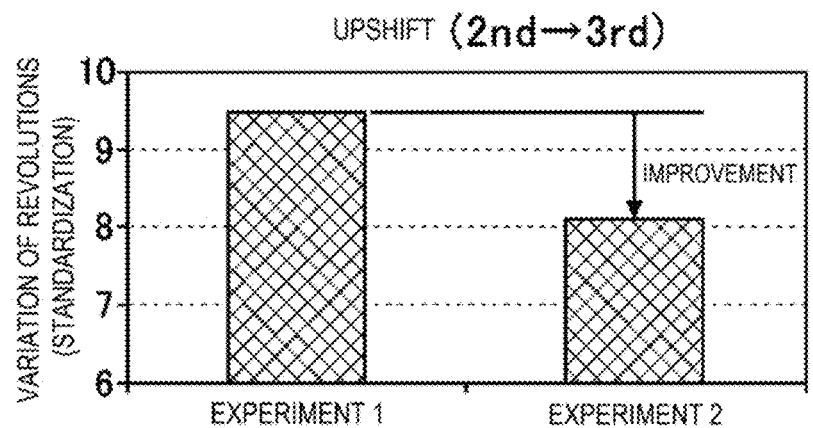
FIG. 6B illustrates the data of the result of an experiment that uses the vehicle sound generation device according to the embodiment of the present disclosure.

Next, the results of experiments that use the vehicle sound generation device according to the embodiment will be described with reference to FIGS. 6A and 6B. FIGS. 6A and 6B illustrate the data of the results of the experiments.

The experiments in FIGS. 6A and 6B use the vehicle 2 of a manual transmission in which the vehicle sound generation device is mounted. Assuming entry to an expressway from a side road, a plurality of drivers accelerated the vehicle 2 from a speed of 0 to 100 km/h while performing an upshift operation of the gear position from the first speed to the third speed. At that time, the number of motor revolutions during the upshift operation was recorded. Experiment 1 and experiment 2 were performed a plurality of times for each of the drivers. In experiment 1, the synthetic sound SC was generated using only the reference sound pressure map MT. In contrast, in experiment 2, the synthetic sound SC was generated using the three maps (MT, MD1, and MD2). During the experiments, the motor revolutions meter and the speedometer were hidden from the drivers.

In addition, in experiment 1 and experiment 2, the variation of the number of motor revolutions when the drivers switched the Gear position from the first speed to the second speed and the variation of the number of motor revolutions when the drivers switched the gear position from the second speed to the third speed were calculated. The smaller the range of the number of motor revolutions in a plurality of upshift operations, the smaller the variation. FIG. 6A illustrates the data during switching of the gear position from the first speed to the second speed. FIG. 6B illustrates the data during switching of the gear position from the second speed to the third speed. FIGS. 6A and 6B illustrate the average values of the data of the plurality of drivers.

The vertical axis in FIGS. 6A and 6B represents the dimensionless value of the variation of the number of motor revolutions during upshift operations. The timing of an upshift operation considered to be appropriate for each of the drivers is different. Accordingly, in the embodiment, attention is focused on the variation in the number of motor revolutions when each of the drivers performs an upshift operation.

It can be seen in FIGS. 6A and 6B that the variation in the number of motor revolutions in experiment 2 is smaller than in experiment 1. That is, the variation in the timing of an upshift operation in the case in which the driver is provided with the synthetic sound SC using the reference sound pressure map MT, the first variable sound pressure map MD1 (FIG. 3B), and the second variable sound pressure map MD2 (FIG. 3C) is significantly smaller than in the case in which the driver is provided with the synthetic sound SC using only the reference sound pressure map MT (FIG. 3A).

In other words, the above experiments have shown that it is possible to promote the driver to perform an upshift operation at a more uniform timing in the case in which the driver is provided with the synthetic sound SC of the frequency that increases while fluctuating as the number of motor revolutions increases than in the case in which the driver is provided with the synthetic sound SC of the frequency that increases monotonically or linearly as the number of motor revolutions increases.

The stochastic resonance phenomenon is considered to be a factor for why the frequency fluctuation components (Sf1 and Sf2) included in the synthetic sound SC improve an accuracy of a driver's operation. That is, fluctuations of the sound pressure (generated by the first variable sound pressure map MD1 and the second variable sound pressure map MD2 function as noise in the stochastic resonance phenomenon and improve the driver's sensitivity to the reference sound pressure (generated by the reference sound pressure map MT).

The present disclosure can be modified as described below. In the above embodiment, the vehicle 2 is an electric vehicle (EV) and does not have an internal combustion engine. However, in an alternative embodiment, the vehicle 2 may be a vehicle having one or both of an internal combustion engine and an electric motor as the rotary power source.

In an embodiment in which the vehicle 2 has only an internal combustion engine, the driver can more clearly grasp the vehicle state and changes in the vehicle state based on a sound generated by the vehicle sound generation device 1 in addition to an engine operating noise. In addition, in this alternative embodiment, the number of revolutions of the internal combustion engine (the number of engine revolutions) can be used to determine the frequency and the sound pressure of the synthetic sound SC.

Furthermore, in another embodiment in which the vehicle 2 has both an internal combustion engine and an electric motor, the number of revolutions of one or both of the electric motor and the internal combustion engine can be used to determine the frequency and the sound pressure of the synthetic sound SC.

Next, the operation of the vehicle sound generation device 1 according to the embodiment will be described.

The vehicle sound generation device 1 according to the embodiment is mounted in the vehicle 2 that travels using the rotary power source including the electric motor 3 and/or the engine. The vehicle sound generation device 1 includes the sound control unit (sound control device 10) that sets the one or more frequencies fn according to the number of revolutions R of the rotary power source (electric motor 3) and generates the synthetic sound signal Ss representing the synthetic sound SC including one or more element sounds having the one or more frequencies fn and the sound output unit (speaker 20) that outputs the synthetic sound SC based on the synthetic sound signal Ss generated by the sound control unit, in which the sound control unit sets the synthetic sound SC so that the sound pressure of the synthetic sound SC includes the reference sound pressure component Sb and the variable sound pressure components Sf1 and Sf2, the reference sound pressure component Sb is set so that the magnitude of the reference sound pressure component Sb increases as the number of revolutions R of the rotary power source (electric motor 3) increases, and the variable sound pressure components Sf1 and Sf2 are set so that the magnitudes of the variable sound pressure components Sf1 and Sf2 vary within the predetermined amplitudes a1 and a2 with periods of p1 and p2 of the predetermined increase amount of the number of revolutions R as the number of revolutions R of the rotary power source (electric motor 3) increases.

In the embodiment, the sound pressure of the synthetic sound SC changes according to the number of revolutions R of the rotary power source (electric motor 3). The synthetic sound SC has the reference sound pressure component Sb and the variable sound pressure components Sf1 and Sf2 corresponding to the number of revolutions R. In the embodiment, the driver can intuitively grasp the operation situation of the rotary power source (electric motor 3) because the magnitude (sound pressure) of the reference sound pressure component Sb increases as the number of revolutions R increases. In addition to this, in the embodiment, since the variable sound pressure components Sf1 and Sf2 as fluctuation components are superimposed on the reference sound pressure component Sb, the driver can perceive changes in the reference sound pressure component Sb more sensitively. Accordingly, in the embodiment, the driver can easily recognize the operation state of the power train of the vehicle 2 including the rotary power source (electric motor 3).

In addition, in the embodiment, each of the sound pressures of one or more element sounds includes the reference sound pressure component Sb and the variable sound pressure components Sf1 and Sf2. In addition, in the embodiment, the reference sound pressure component Sb of each of the element sounds is set so that the magnitude of the reference sound pressure component Sb of each of the element sounds increases as the number of revolutions P of the rotary power source (electric motor 3) increases, and the variable sound pressure components Sf1 and Sf2 of each of the element sounds is set so that the magnitudes of the variable sound pressure components Sf1 and Sf2 of each of the element sounds vary within the predetermined amplitudes a1 and a2 with period of p1 and p2 of the predetermined increase amount of the number of revolutions R as the number of revolutions R of the rotary power source (electric motor 3) increases.

In addition, in the embodiment, the sound control unit (sound control device 10) is configured so that only when the accelerator opening Ac of the vehicle 2 is equal to or more than the predetermined value (first threshold or second threshold) (Yes in S4 or Yes in S5), the sound pressures of the one or more elemental sounds include the variable sound pressure components Sf1 and Sf2.

With this structure, in the embodiment, fluctuations (variable sound pressure components Sf1 and Sf2) can be added to the synthetic sound SC when the driver accelerates the vehicle 2 by depressing the accelerator. Accordingly, in the embodiment, the driver can easily recognize the operation state of the power train when the vehicle 2 accelerates.

In addition, in the embodiment, the sound control unit (sound control device 10) is configured so as to set the synthetic sound including the variable sound pressure component Sf2 having a shorter period as the accelerator opening Ac is higher (Yes S5). In the embodiment, the synthetic sound SC includes the first variable sound pressure component Sf1 (does not include the second variable sound pressure component Sf2) when the accelerator opening Ac is equal to or more than the first threshold and less than the second threshold (Yes in S4 and No in S5) and the synthetic sound SC, includes the second variable sound pressure component Sf2 when the accelerator opening Ac is equal to or more than the second threshold (Yes in S5).

In addition, in the embodiment, the period p2 of the variable sound pressure component Sf2 is specifically set to 700 rpm to 1200 rpm. It has been found from the results of the experiments that the operation accuracy of the driver is improved when the period p2 of the fluctuation component Sf2 of the sound pressure added to the synthetic sound SC is 700 rpm to 1200 rpm as in the embodiment. In addition, in the embodiment, the number of revolutions R of the rotary power source (electric motor 3) ranges from at least 0 rpm to 6000 rpm.

In addition, in the embodiment, the predetermined amplitude a2 of the variable sound pressure component Sf2 is specifically set to 8% to 13% of the magnitude of the reference sound pressure component Sb. It has been found from the results of the experiments that, when the amplitude a2 of the fluctuation component Sf2 of the sound pressure added to the synthetic sound SC is 8% to 13% of the magnitude of the reference sound pressure component Sb as in the embodiment, the operation accuracy of the driver is improved.

[Description of Reference Signs and Numerals]

In accordance with the present disclosure, a vehicle sound generation device generates a sound so that the driver can easily recognize changes in the vehicle state.

To achieve the above object, there is provided a vehicle sound generation device mounted in a vehicle that travels with a rotary power source including an electric motor and/or an engine, the vehicle sound generation device including a sound control unit configured to set one or more frequencies according to the number of revolutions of the rotary power source and generate a synthetic sound signal representing a synthetic sound including one or more element sounds having the one or more frequencies; and a sound output unit configured to output the synthetic sound based on the synthetic sound signal generated by the sound control unit, in which the sound control unit sets the synthetic sound so that a sound pressure of the synthetic sound includes a reference sound pressure component and a variable sound pressure component, the reference sound pressure component is set so that a magnitude of the reference sound pressure component increases as the number of revolutions of the rotary power source increases, and the variable sound pressure component is set so that the magnitude of the variable sound pressure component varies within a predetermined amplitude with a period of a predetermined increase amount of the number of revolutions as the number of revolutions of the rotary power source increases.

According to the present disclosure configured as described above, the sound pressure of the synthetic sound changes according to the number of revolutions of the rotary power source. The synthetic sound has the reference sound pressure component and the variable sound pressure component that correspond to the number of revolutions. In the present disclosure, since the magnitude (sound pressure) of the reference sound pressure component increases as the number of revolutions increases, the driver can intuitively grasp the operation situation of the rotary power source. In addition, since the variable sound pressure component as a fluctuation component is superimposed on the reference sound pressure component in the present disclosure, the driver can perceive changes in the reference sound pressure component more sensitively. Accordingly, in the present disclosure, the driver can easily recognize the operation state of the power train of the vehicle including the rotary power source.

In addition, in the present disclosure, the sound pressure of each of the one or more element sounds includes the reference sound pressure component and the variable sound pressure component. In addition, in the present disclosure, the reference sound pressure component of each of the element sounds is set so that the magnitude of the reference sound pressure component of each of the element sounds increases as the number of revolutions of the rotary power source increases and the variable sound pressure component of each of the element sounds is set so that the magnitude of the variable sound pressure component of each of the element sounds varies within the predetermined amplitude with a period of the predetermined increase amount of the number of revolutions as the number of revolutions of the rotary power source increases.

In addition, in the present disclosure, the sound control unit causes sound pressures of the one or more element sounds to include the variable sound pressure component only when an accelerator opening of the vehicle is equal to or more than a predetermined value.

According to the present disclosure configured as described above, when the driver accelerates the vehicle by depressing the accelerator, fluctuations (variable sound pressure component) can be added to the synthetic sound. Therefore, according to the present disclosure, the driver can easily recognize the operation state of the power train when the vehicle accelerates.

In addition, in the present disclosure, the sound control unit sets the synthetic sound so as to include the variable sound pressure component with a shorter period as the accelerator opening is larger.

In addition, in the present disclosure, the period of the variable sound pressure component is set to 700 rpm to 1200 rpm. It is apparent from the result of an experiment that the operation accuracy of the driver is improved when the period of the fluctuation component of the sound pressure to be added to the synthetic sound is 700 rpm to 1200 rpm as in the present disclosure. In addition, in the present disclosure, the number of revolutions of the rotary power source varies at least in a range from 0 rpm to 6000 rpm.

In addition, in the present disclosure, the predetermined amplitude of the variable sound pressure component is set to 8% to 13% of the magnitude of the reference sound pressure component. It is apparent from the result of the experiment that the operating accuracy of the driver is improved when the amplitude of the fluctuation component of the sound pressure to be added to the synthetic sound is 8% to 13% of the magnitude of the reference sound pressure component as in the present disclosure.

1: vehicle sound generation device
2: vehicle
3: electric motor
10: sound control device
12: control unit
14: storage unit
20: speaker
30: sensor group
31: motor revolutions sensor
32: motor torque sensor
33: vehicle speed sensor
34: acceleration position sensor
L1, L2, L3: characteristic line
MD1: first variable sound pressure map
MD2: second variable sound pressure map
MT: reference sound pressure map
Sb: reference sound pressure component
Sf1: first variable sound pressure component
Sf2: second variable sound pressure component
Ss: synthetic sound signal

The invention claimed is:

1. A vehicle sound generation device mounted in a vehicle that travels with a rotary power source including an electric motor and/or an engine, the vehicle sound generation device comprising:
   a sound control circuit configured to
      set one or more frequencies according to a number of revolutions of the rotary power source; and
      generate a synthetic sound signal representing a synthetic sound including one or more element sounds having the one or more frequencies, wherein
   the sound control circuit sets the synthetic sound so that a sound pressure of the synthetic sound includes a reference sound pressure component and a variable sound pressure component,
   the reference sound pressure component is set so that a magnitude of the reference sound pressure component increases as the number of revolutions of the rotary power source increases, and
   the variable sound pressure component is set so that a magnitude of the variable sound pressure component varies within a predetermined amplitude with a period of a predetermined increase amount f the number of revolutions as the number of revolutions of the rotary power source increases.

2. The vehicle sound generation device according to claim 1,
   wherein the sound control circuit sets the synthetic sound so that sound pressures of the one or more element sounds include the variable sound pressure component only when an accelerator opening of the vehicle is equal to or more than a predetermined value.

3. The vehicle sound generation device according to claim 2,
   wherein the period of the variable sound pressure component is set to 700 rpm to 1200 rpm.

4. The vehicle sound generation device according to claim 3,
   wherein the predetermined amplitude of the variable sound pressure component is set to 8% to 13% of the magnitude of the reference sound pressure component.

5. The vehicle sound generation device according to claim 1,
   wherein the period of the variable sound pressure component is set to 700 rpm to 1200 rpm.

6. The vehicle sound generation device according to claim 1,
   wherein the predetermined amplitude of the variable sound pressure component is set to 8% to 13% of the magnitude of the reference sound pressure component.

7. The vehicle sound generation device according to claim 2,
   wherein the predetermined amplitude of the variable sound pressure component is set to 8% to 13% of the magnitude of the reference sound pressure component.

8. The vehicle sound generation device according to claim 5,
   wherein the predetermined amplitude of the variable sound pressure component is set to 8% to 13% of the magnitude of the reference sound pressure component.

9. The vehicle sound generation device according to claim 1, further comprising:
   a speaker, wherein
   the sound control circuit is further configured to output the synthetic sound signal to the speaker, and
   the speaker is configured to output the synthetic sound based on the synthetic sound signal.

10. The vehicle sound generation device according to claim 9,
    wherein the speaker includes an amplifies, and
    to output the synthetic sounds, the speaker is configured to receive the synthetic sound signal from the sound control circuit, amplify the synthetic sound signal with a predetermined amplification factor, and then output the synthetic sound based on the amplified synthetic sound signal.

11. The vehicle sound generation device according to claim 1, further comprising:
    a memory that stores sound pressure maps, wherein
    the sound control circuit is configured to control an input and output of data, including the sound pressure maps, to the memory.

* * * * *